United States Patent [19]

Itoh

[11] 4,359,269
[45] Nov. 16, 1982

[54] VARIABLE POWER COPYING LENS SYSTEM

[75] Inventor: Takayuki Itoh, Hatoyamamura, Japan

[73] Assignee: Asahi Kogaku Kogyo Kabushiki Kaisha, Tokyo, Japan

[21] Appl. No.: 262,246

[22] Filed: May 11, 1981

[30] Foreign Application Priority Data

May 13, 1980 [JP] Japan .................................. 55-63055

[51] Int. Cl.³ .............................................. G02B 15/00
[52] U.S. Cl. .................................................... 350/425
[58] Field of Search ........................................ 350/425

[56] References Cited

U.S. PATENT DOCUMENTS 3,973,831  8/1976  Minoura .............................. 350/425
4,037,937  7/1977  Minoura .............................. 350/425
4,149,774  4/1979  Hirano et al. ...................... 350/425

Primary Examiner—John K. Corbin
Assistant Examiner—Scott J. Sugarman
Attorney, Agent, or Firm—Sughrue, Mion, Zinn, Macpeak & Seas

[57] ABSTRACT

A variable power copying lens system having an intermediate range of variable magnification with superior distortion aberration compensation and compact size. The lens system includes, in order from the object side, a first lens group having a negative focal length, a second lens group having a positive focal length and a third lens group having a negative focal length. The distance between the first and second lens groups and the distance between the second and third lens groups is variable simultaneously with variation of the overall lens system position to thereby maintain the distance between the object surface and image surface constant.

2 Claims, 8 Drawing Figures

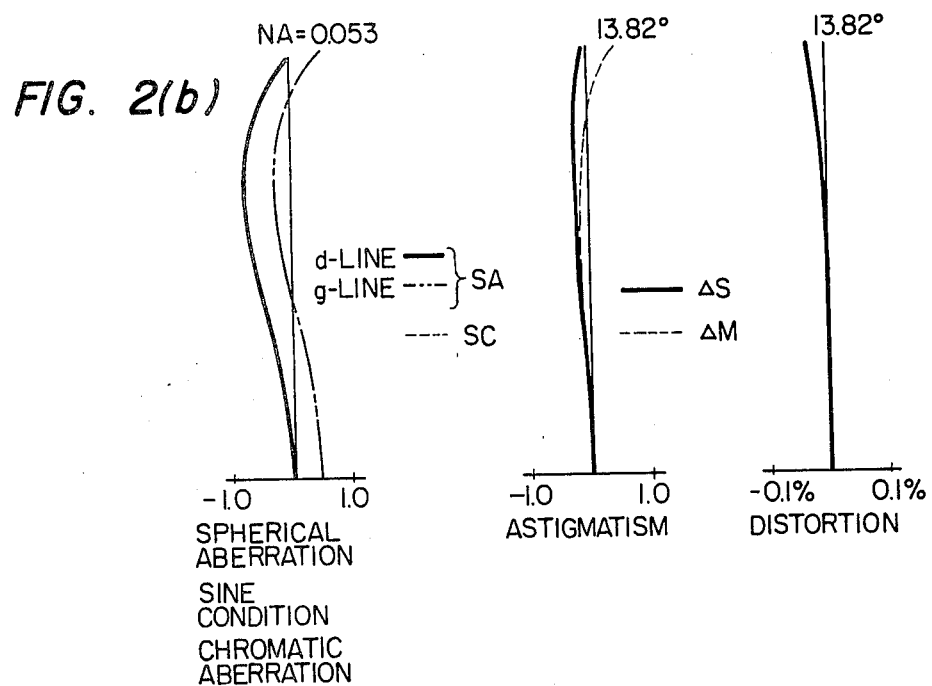
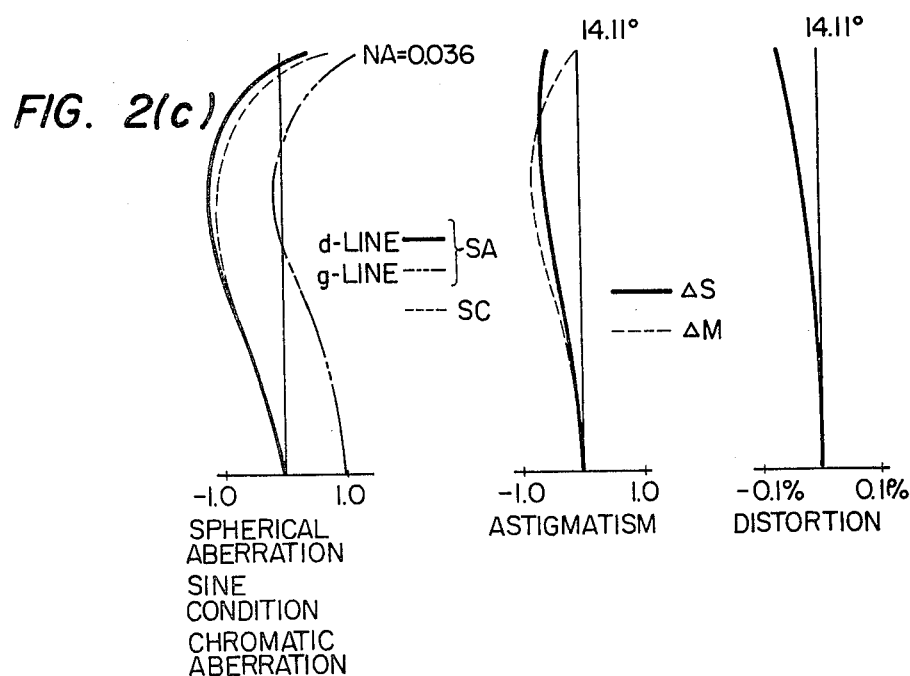

FIG. 3
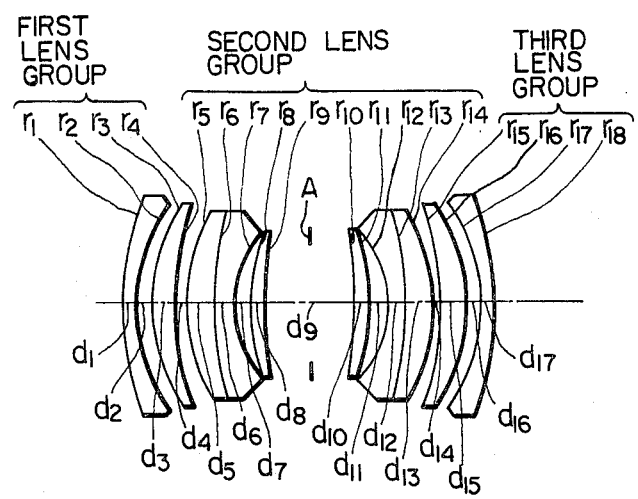
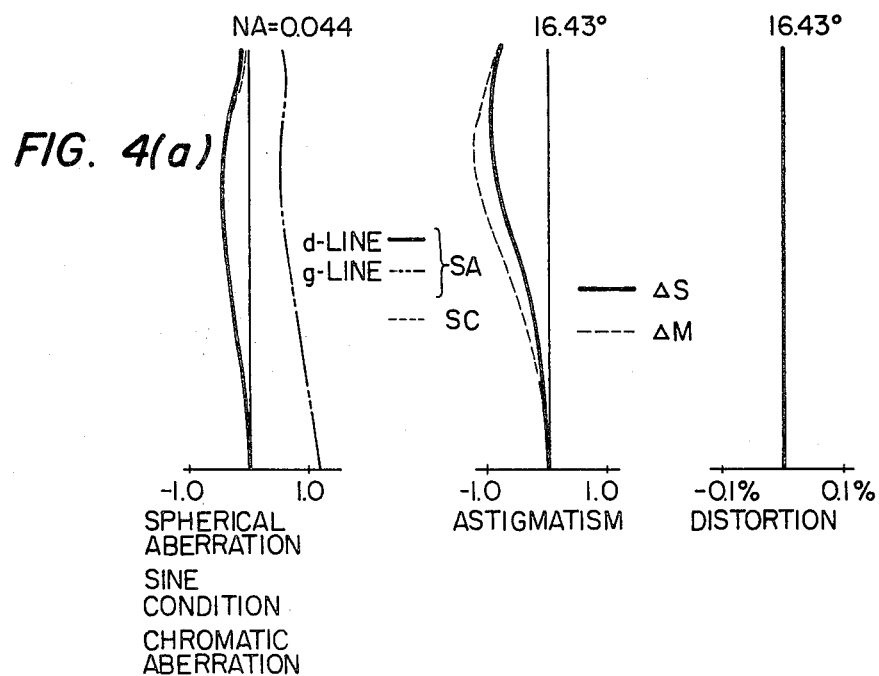
FIG. 4(a)

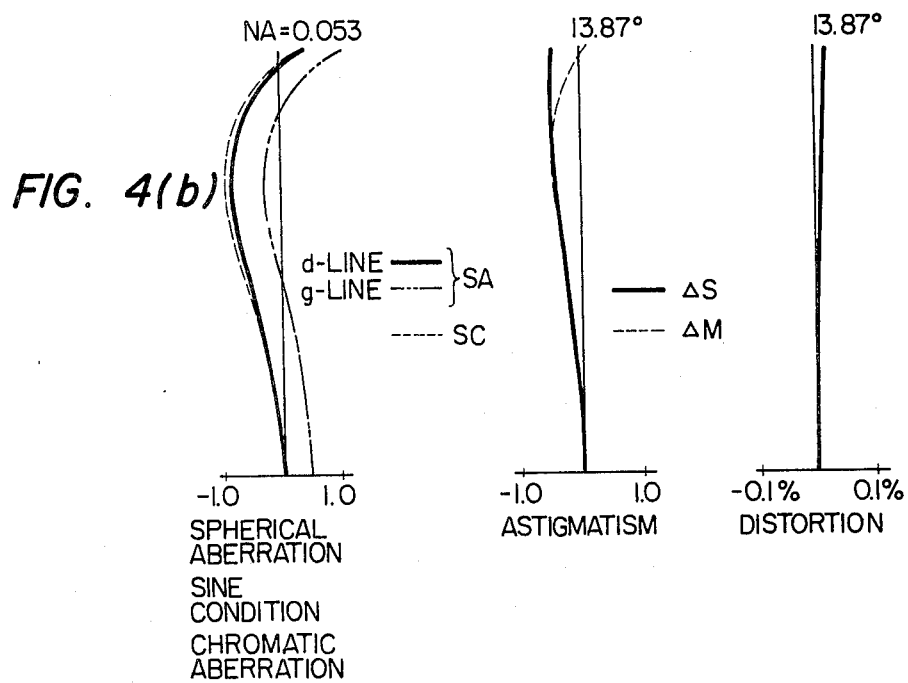
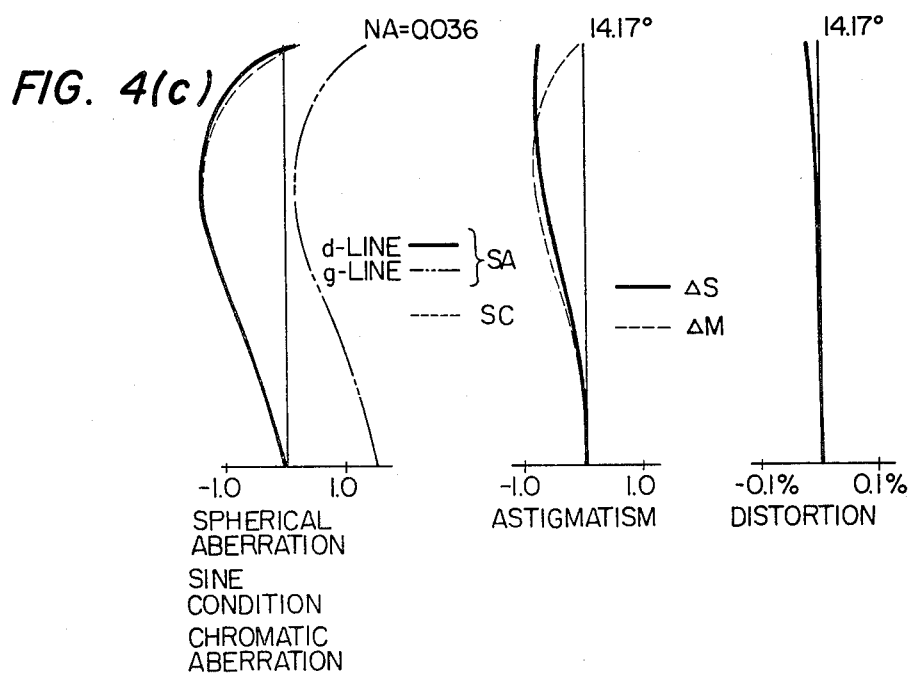

VARIABLE POWER COPYING LENS SYSTEM

BACKGROUND OF THE INVENTION

The present invention relates to a lens system in which in a copying system such as a large size copying camera or duplicating camera, the distance between the objective suface and the film surface is maintained constant and the overall lens system is moved therebetween to thereby carry out variable magnification copying. In such a copying lens system, it is particularly necessary to compensate for various aberrations and to provide a sufficient quantity of marginal light.

Prior art copying lens systems may be classified into two groups, a first group having a wide range of magnification extending from a reduced size to a enlarged size and a second having a narrow range of magnification extending only from the reduced size to the size of the original or from the size of the original to the enlarged size. A lens system of the first group is disclosed in unexamined Japanese Patent Publication Nos. 49/1242 and 53/60655 and Japanese Patent Application No. 53/84872 which are assigned to the assignee of the present application. In these lens systems, the magnification variation ratio is high resulting in the lens system having a large physical size. Such a lens system moreover requires three or four separate lens groups with the result that the movements of the lens groups are intricate for maintaining constant the distance between the object surface and the film surface.

Lens systems of the second group are disclosed in unexamined Japanese Patent Publication No. 54/44554 and Japanese Patent Publication No. 54/77925 which was filed by the present application. The lens disclosed therein is of type having an asymmetrical construction. Therefore, its power variation and performance are limited to a certain level.

SUMMARY OF THE INVENTION

The lens system of the present invention has an intermediate value, about 3, of magnification and is variable between those of the first and second groups described above. The lens construction of the invention is similar to that of the first group. With such a construction, the copying variable power lens system of the invention is superior, particularly in distortion aberration compensation among various aberration compensations and, in addition, is practical and compact.

BRIEF DESCRIPTION OF THE DRAWINGS

FIGS. 1 and 3 show lens constructions according to two preferred embodiments of the invention; and FIGS. 2 and 4 are graphs of various aberrations in the lens constructions of FIGS. 1 and 2, respectively, (a), (b) and (c) denoting aberration curves at equal, reduced and enlarged magnifications, where $r_i$ is the radius of curvature of the indicated lens surface, $d_i$ is the lens thickness or the space between lens surfaces, and A designates a stop diaphragm.

DESCRIPTION OF THE PREFERRED EMBODIMENTS

Figure 1:
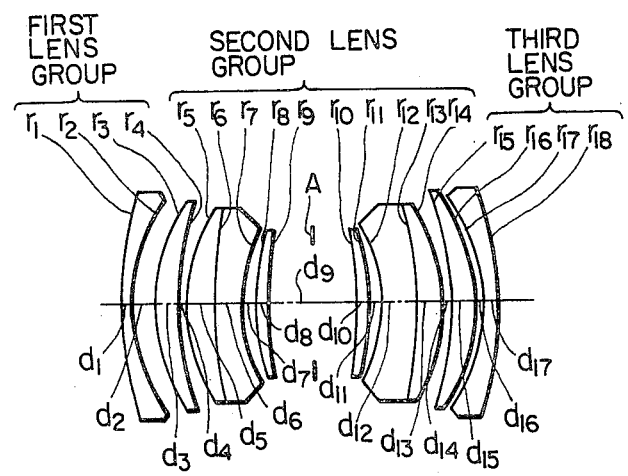
Figure 2A:
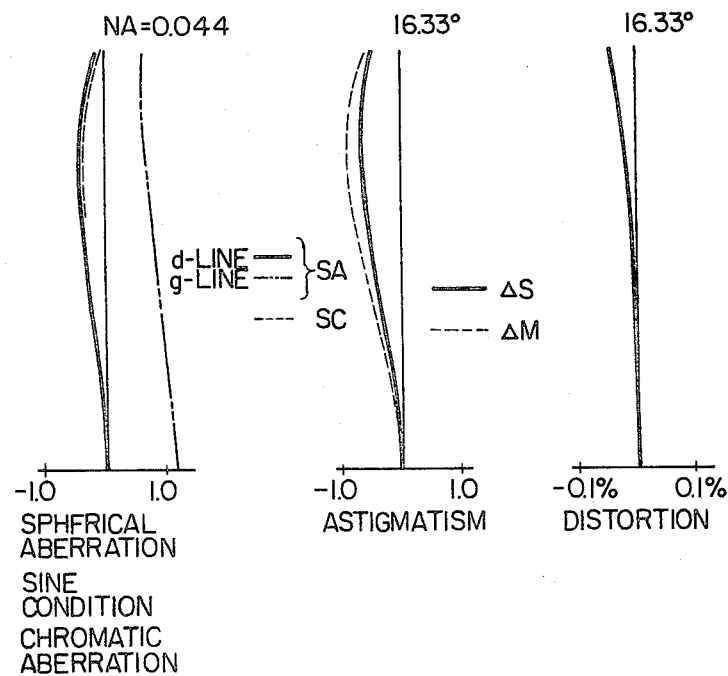

Preferred embodiments of the present invention will now be described.

In the lens construction of the present invention of a variable power copying lens system, there is provided in order from the object side, a first lens group having a negative focal length, a second lens group having a positive focal length and a third lens group having a negative focal length, wherein the distance between the first and second lens groups and the distance between the second and third lens groups is variable while simultaneously the overall lens system is moved to thereby maintain the distance between the object surface and the image surface constant. In this variable power copying lens system, the first and third lens groups mainly function to maintain the distance between the object surface and the image surface constant, and the movement of the second lens group mainly functions to provide a variable power effect. The first lens group is composed, in order from the object side, of a negative meniscus lens convex on the object side and a positive meniscus lens convex on the object side. The second lens group is composed substantially of a lens type used in a fixed focus copying lens and it has a stop diaphragm therein. The second lens is composed, in order from the stop diaphragm on the object side, of a positive meniscus lens concave to said stop diaphragm and a cemented lens including a negative meniscus lens concave toward the stop diaphragm and a positive meniscus lens concave toward the stop diaphragm, and in order from the stop diaphragm on the image side, of a positive meniscus lens concave toward the stop diaphragm and a cemented lens including a negative meniscus lens concave toward the stop diaphragm and a positive meniscus lens concave toward the stop diaphragm. The third lens group is composed, in order from the image side, of a negative meniscus lens convex on the image side and a positive meniscus lens convex on the image side. Moreover, the overall lens system satisfies the following conditions:

$$1.1 < \frac{m_{max}}{M_{min}} < 3.0, \tag{1}$$

$$-0.5 \leq \frac{f_{max}}{f_I} \leq -0.1, \tag{2}$$

$$-0.5 \leq \frac{f_{max}}{f_{III}} \leq -0.1, \tag{3}$$

$$0.03 \leq \frac{\Delta D_{I, II}}{f_{max}} \leq 0.15, \tag{4}$$

$$0.03 \leq \frac{\Delta D_{I, III}}{f_{max}} \leq 0.15, \tag{5}$$

$$0.1 \leq \frac{r_{IP}}{f_{max}} \leq 0.35, \text{ and} \tag{6}$$

$$0.1 \leq \frac{|r_{IIIP}|}{f_{max}} \leq 0.35 \ (r_{IIIP} < 0). \tag{7}$$

where:

$M_{max}$ is the magnification on the highest variable power side in the variable power range.

$M_{min}$ is the magnification on the lowest variable power side (reduction side) in the variable power range.

$M_{max}/M_{min}$ is the variable power ratio, $f_{max}$ is the overall focal length at the equal magnification setting, $f_I$ is the focal length of the first lens group, $f_{II}$ is the focal length of the second lens group, $f_{III}$ is the focal length of the third lens group, $\Delta D_{I,II}$ is the difference between movement distances of the first and second lens groups, $\Delta D_{II,III}$ is the difference between movement distances of the second and third lens groups, $r_{IP}$ is the radius of curvature of the positive meniscus lens of the first lens group, and $r_{IIIP}$ is the radius of curvature of the positive meniscus lens of the third lens group.

The first lens group is composed, in order from the object side, of at least one positive meniscus lens convex to the object and at least one positive meniscus lens convex to the object and the third lens group is composed, in order from the image side, of at least one negative meniscus lens convex to the image and at least one positive meniscus lens convex to the image. With such an arrangement, chromatic aberration is compensated for in each lens group and distortion is greatly reduced in the overall variational range while variations of aberrations, particularly of distortion, are reduced.

With the arrangement of the second lens group in which all of the concave lens surfaces are directed toward the stop diaphragm, the same purposes are carried out.

The above described conditions will be discussed in more detail.

Condition (1) defines the range of the variable power ratio. If the lower limit is exceeded, the variable power ratio is excessively small, practically the same as that of a fixed focal length lens. Inversely, if the upper limit is exceeded, it is impossible to provide a compact copying variable power lens.

Conditions (2), (3), (4) and (5) relate to the refractive power. If the upper limit of Conditions (2) and (3) is exceeded, although the lens system can then easily be miniaturized, the negative refractive powers of the first and third lens groups are too large and the curvatures of each lens surfaces are too high. This leads to variations of spherical aberration and astigmatism and an increase of astigmatism in the variable power control. Inversely, if the upper limit thereof is exceeded, although aberration compensation is adequately performed, the distances between the first and second lens groups and between the second and third lens groups are increased resulting in an increase of a physical length of the lens system.

In connection with Conditions (2) and (3), if the lower limit of Conditions (4) and (5) is exceeded, the overall lens system can then easily be miniaturized, it is necessary to increase the negative refractive powers of the first and third lens groups in order to increase or decrease the variable power ratio. This is not desirable for aberration compensation. If the upper limit is exceeded, it is impossible to miniaturize the lens system.

Comdition (6) relates to the first lens group. If the lower limit is exceeded, the curvatures of lens surfaces are exceedingly increased to thereby generate high order aberrations. This is not suitable for a lens system having moving sections. For variable power operation, the variation of aberrations is remarkable. When the upper limit is exceeded, although aberration correction is adequate, it is necessary to decrease the refractive powers of the various lens groups resulting in an increase of the physical lens system length.

Condition (7) relating to the third lens group, is imposed for the same reasons as Condition (6).

The variable power range of the present invention includes an equal magnification position, and the magnification factor at the maximum enlarged size does not exceed two. Therefore, good performance is obtained even if a symmetrical lens construction with respect to the stop diaphragm is used.

Examples 1 and 2 of lens systems constructed according to the invention will now be described in the tables below in which f is the overall focal length, $\omega$ is the half viewing angle of a primary light ray, F is the F-number at the infinite object distance, m is the magnification factor, and NA is the aperture number represented by the equation:

$$NA = \frac{1}{2F(1 + |m|)} \cdot H_{max} \text{ and } y_{max} \text{ denote the}$$

maximum height of an object and height of the image, respectively, $r_i$ is the radius of curvature, $d_i$ is the lens thickness or the space between adjacent lenses, N is the refractive power at the $\alpha$-line and $\nu$ is the Abbe number.

EXAMPLE 1

F = 1:5.7  f = 245.3 ~ 256.0 ~ 248.0
$\omega$ = 13.8° ~ 16.3° ~ 14.1°
NA = 0.053 ~ 0.044 ~ 0.036
m = −0.67 ~ −1 ~ −1.414
$H_{max} = Y_{max} = 150$

| lens no. | r | d | N | $\nu$ |
|---|---|---|---|---|
| 1 | 107.969 | 4.00 | 1.51633 | 64.1 |
| 2 | 54.495 | 7.07 | | |
| 3 | 54.739 | 8.00 | 1.51823 | 59.0 |
| 4 | 80.535 | 3.00 | | |
| 5 | 51.496 | 9.10 | 1.69680 | 55.5 |
| 6 | 114.028 | 9.36 | 1.60342 | 38.0 |
| 7 | 40.394 | 5.00 | | |
| 8 | 65.366 | 4.50 | 1.65160 | 58.6 |
| 9 | 121.506 | 30.10 | | |
| 10 | −149.350 | 4.50 | 1.65160 | 58.6 |
| 11 | −74.670 | 5.00 | | |
| 12 | −42.391 | 11.05 | 1.57501 | 41.5 |
| 13 | −136.193 | 9.10 | 1.67000 | 57.4 |
| 14 | −56.934 | 3.00 | | |
| 15 | −97.001 | 8.00 | 1.51823 | 59.0 |
| 16 | −54.974 | 3.10 | | |
| 17 | −54.650 | 4.00 | 1.55963 | 61.2 |
| 18 | −114.084 | | | |

| magnification variable distance | −1 | −0.67 | −1.414 |
|---|---|---|---|
| $d_4$ | 3.00 | 17.997 | 14.174 |
| $d_{14}$ | 3.00 | 17.997 | 14.174 |

| | |
|---|---|
| (1) | $M_{max}/M_{min} = 2.11$ |
| (2) | $f_{max}/f_I = -0.335$ |
| (3) | $f_{max}/f_{III} = -0.253$ |
| (4) | $\Delta D_{I,II}/f_{max} = 0.0586$ |
| (5) | $\Delta D_{II,III}/f_{max} = 0.0586$ |
| (6) | $r_{IP}/f_{max} = r_3/f_{max} = 0.214$ |
| (7) | $|r_{IIIP}|/f_{max} = |r_{16}|/f_{max} = 0.215$ |

EXAMPLE 2

F = 1:5.7
f = 244.5 ~ 255.1 ~ 247.1
$\omega$ = 13.9° ~ 16.4° ~ 14.2°
NA = 0.053 ~ 0.044 ~ 0.036
m = −0.67 ~ −1 ~ −1.414
$H_{max} = y_{max} = 150$

| lens no. | r | d | N | $\nu$ |
|---|---|---|---|---|
| 1 | 106.058 | 4.00 | 1.58913 | 61.0 |
| 2 | 53.925 | 5.09 | | |
| 3 | 54.457 | 8.00 | 1.56883 | 56.3 |
| 4 | 84.252 | 3.00 | | |
| 5 | 52.141 | 9.50 | 1.69680 | 55.5 |
| 6 | 102.230 | 8.13 | 1.60342 | 38.0 |

-continued

| | | | | |
|---|---|---|---|---|
| 7 | 40.624 | 5.00 | | |
| 8 | 69.007 | 4.50 | 1.65160 | 58.6 |
| 9 | 136.414 | 29.84 | | |
| 10 | −136.414 | 4.50 | 1.65160 | 58.6 |
| 11 | −69.007 | 5.00 | | |
| 12 | −40.624 | 8.13 | 1.60342 | 38.0 |
| 13 | −102.230 | 9.50 | 1.69680 | 55.5 |
| 14 | −52.141 | 3.00 | | |
| 15 | −84.252 | 8.00 | 1.56883 | 56.3 |
| 16 | −54.457 | 5.09 | | |
| 17 | −53.925 | 4.00 | 1.58913 | 61.0 |
| 18 | −106.058 | | | |

| variable distance | magnification | | |
|---|---|---|---|
| | −1 | −0.67 | −1.414 |
| $d_4$ | 3.00 | 15.939 | 12.646 |
| $d_{14}$ | 3.00 | 15.939 | 12.646 |

(1) $M_{max}/M_{min} = 2.11$
(2) $f_{max}/f_I = -0.330$
(3) $f_{max}/f_{III} = -0.330$
(4) $\Delta D_{I,II}/f_{max} = 0.0507$
(5) $\Delta D_{II,III}/f_{max} = 0.0507$
(6) $r_{IP}/f_{max} = r_3/f_{max} = 0.213$
(7) $|r_{IIIP}|/f_{max} = |r_{16}|/f_{max} = 0.213$ -continued

| | | | | |
|---|---|---|---|---|
| 5 | 51.496 | 9.10 | 1.69680 | 55.5 |
| 6 | 114.028 | 9.36 | 1.60342 | 38.0 |
| 7 | 40.394 | 5.00 | | |
| 8 | 65.366 | 4.50 | 1.65160 | 58.6 |
| 9 | 121.506 | 30.10 | | |
| 10 | −149.350 | 4.50 | 1.65160 | 58.6 |
| 11 | −74.670 | 5.00 | | |
| 12 | −42.391 | 11.05 | 1.57501 | 41.5 |
| 13 | −136.193 | 9.10 | 1.67000 | 57.4 |
| 14 | −56.934 | 3.00 | | |
| 15 | −97.001 | 8.00 | 1.51823 | 59.0 |
| 16 | −54.974 | 3.10 | | |
| 17 | −54.650 | 4.00 | 1.55963 | 61.2 |
| 18 | −114.084 | | | |

| magnification variable distance | | | |
|---|---|---|---|
| | −1 | −0.67 | −1.414 |
| $d_4$ | 3.00 | 17.997 | 14.174 |
| $d_{14}$ | 3.00 | 17.997 | 14.174 |

(1) $M_{max}/M_{min} = 2.11$
(2) $f_{max}/f_I = -0.335$
(3) $f_{max}/f_{III} = -0.253$
(4) $\Delta D_{I,II}/f_{max} = 0.0586$
(5) $\Delta D_{II,III}/f_{max} = 0.0586$
(6) $r_{IP}/f_{max} = r_3/f_{max} = 0.214$
(7) $|r_{IIIP}|/f_{max} = |r_{16}|/f_{max} = 0.215$ wherein: f is an overall focal lens of said lens system, $\omega$ is a half viewing angle of a primary light ray, F is a F-number at an infinite object distance, m is a magnification factor, $M_{max}/M_{min}$ is the variable power ratio, and NA is an aperture number defined by $NA = 1/[2F(1+|m|)]$, $H_{max}$ is a maximum height of an object, $y_{max}$ is a maximum height of an image, $r_i$ is a radius of curvature of an i-th lens surface, $d_i$ is a lens thickness or a space between adjacent lenses, N is a refractive power at an α-line and $\nu$ is an Abbe number.

What is claimed is:

1. A variable power copying lens system comprising, in order from the object side, a first lens group having a negative focal length, a second lens group having a positive focal length and a third lens group having a negative focal length, a distance between said first and second lens groups and a distance said second and third lens groups being variable while said lens system is moved to thereby maintain the distance between an object surface and an image surface constant, said first and third lens groups mainly functioning to maintain said distance between said object surface and said image surface constant, and movement of said second lens group mainly providing a variable power effect, said first lens group comprising, in order from the object side, a negative meniscus lens convex on the object side and a positive meniscus lens convex on the object side, said second lens group comprising substantially a lens type used in a fixed focus copying lens and said second lens having a stop diaphragm therein, said second lens comprising, in order from said stop diaphragm on the object side, a positive meniscus lens concave toward said stop diaphragm and a cemented lens including a negative meniscus lens concave toward said stop diaphragm and a positive meniscus lens concave toward said stop diaphragm, and in order from said stop diaphragm on the image side, a positive meniscus lens concave toward said stop diaphragm and a cemented lens including a negative meniscus lens concave toward said stop diaphragm and a positive meniscus lens concave toward said stop diaphragm, said third lens group comprising, in order from the image side, a negative meniscus lens convex on the image side and a positive meniscus lens convex on the image side, said lens system satisfying:

$F = 1:5.7 \quad f = 245.3 \sim 256.0 \sim 248.0$
$\omega = 13.8° \sim 16.3° \sim 14.1°$
$NA = 0.053 \sim 0.044 \sim 0.036$
$m = -0.67 \sim -1 \sim -1.414$
$H_{max} = Y_{max} = 150$

| lens no. | r | d | N | $\nu$ |
|---|---|---|---|---|
| 1 | 107.969 | 4.00 | 1.51633 | 64.1 |
| 2 | 54.495 | 7.07 | | |
| 3 | 54.739 | 8.00 | 1.51823 | 59.0 |
| 4 | 80.535 | 3.00 | | |

2. A variable power copying lens system comprising, in order from the object side, a first lens group having a negative focal length, a second lens group having a positive focal length and a third lens group having a negative focal length, a distance between said first and second lens groups and a distance said second and third lens groups being variable while said lens system is moved to thereby maintain the distance between an object surface and an image surface constant, said first and third lens groups mainly functioning to maintain said distance between said object surface and said image surface constant, and movement of said second lens group mainly providing a variable power effect, said first lens group comprising, in order from the object side, a negative meniscus lens convex on the object side and a positive meniscus lens convex on the object side, said second lens group comprising substantially a lens type used in a fixed focus copying lens and said second lens having a stop diaphragm therein, said second lens comprising, in order from said stop diaphragm on the object side, a positive meniscus lens concave toward said stop diaphragm and a cemented lens including a negative meniscus lens concave toward said stop diaphragm and a positive meniscus lens concave toward said stop diaphragm, and in order from said stop diaphragm on the image side, a positive meniscus lens concave toward said stop diaphragm and a cemented lens including a negative meniscus lens concave toward said stop diaphragm and a positive meniscus lens concave toward said stop diaphragm, said third lens group comprising, in order from the image side, a negative meniscus lens convex on the image side and a positive meniscus lens convex on the image side, said lens system satisfying:

$F = 1:5.7$
$f = 244.5 \sim 255.1 \sim 247.1$
$\omega = 13.9° \sim 16.4° \sim 14.2°$
$NA = 0.053 \sim 0.044 \sim 0.036$
$m = -0.67 \sim -1 \sim -1.414$
$H_{max} = y_{max} = 150$

| lens no. | r | d | N | ν |
|---|---|---|---|---|
| 1 | 106.058 | 4.00 | 1.58913 | 61.0 |
| 2 | 53.925 | 5.09 | | |
| 3 | 54.457 | 8.00 | 1.56883 | 56.3 |
| 4 | 84.252 | 3.00 | | |
| 5 | 52.141 | 9.50 | 1.69680 | 55.5 |
| 6 | 102.230 | 8.13 | 1.60342 | 38.0 |
| 7 | 40.624 | 5.00 | | |
| 8 | 69.007 | 4.50 | 1.65160 | 58.6 |
| 9 | 136.414 | 29.84 | | |
| 10 | −136.414 | 4.50 | 1.65160 | 58.6 |
| 11 | −69.007 | 5.00 | | |
| 12 | −40.624 | 8.13 | 1.60342 | 38.0 |
| 13 | −102.230 | 9.50 | 1.69680 | 55.5 |
| 14 | −52.141 | 3.00 | | |
| 15 | −84.252 | 8.00 | 1.56883 | 56.3 |
| 16 | −54.457 | 5.09 | | |
| 17 | −53.925 | 4.00 | 1.58913 | 61.0 |
| 18 | −106.058 | | | |

| variable distance | magnification | | |
|---|---|---|---|
| | −1 | −0.67 | −1.414 |
| $d_4$ | 3.00 | 15.939 | 12.646 |
| $d_{14}$ | 3.00 | 15.939 | 12.646 |

(1) $M_{max}/M_{min} = 2.11$
(2) $f_{max}/f_I = -0.330$
(3) $f_{max}/f_{III} = -0.330$
(4) $\Delta D_{I,II}/f_{max} = 0.0507$
(5) $\Delta D_{II,III}/f_{max} = 0.0507$
(6) $r_{IP}/f_{max} = r_3/f_{max} = 0.213$
(7) $|r_{IIIP}|/f_{max} = |r_{16}|/f_{max} = 0.213$ wherein: f is an overall focal lens of said lens system, ω is a half viewing angle of a primary light ray, F is a F-number at an infinite object distance, m is a magnification factor, $M_{max}/M_{min}$ is the variable power ratio, and NA is an aperture number defined by $NA = 1/[2F(1+|m|)]$, $H_{max}$ is a maximum height of an object, $y_{max}$ is a maximum height of an image, $r_i$ is a radius of curvature of an i-th lens surface, $d_i$ is a lens thickness or a space between adjacent lenses, N is a refractive power at a d-line and ν is an Abbe number.

* * * * *